(12) United States Patent
Harmon et al.

(10) Patent No.: US 11,583,882 B2
(45) Date of Patent: Feb. 21, 2023

(54) SYSTEM AND METHOD FOR CONTROLLING THE GROUND SPEED OF AN AGRICULTURAL SPRAYER BASED ON A SPRAY QUALITY PARAMETER

(71) Applicant: CNH Industrial America LLC, New Holland, PA (US)

(72) Inventors: Andrew W. Harmon, Sheboygan, WI (US); Trevor Stanhope, Palos Hills, IL (US)

(73) Assignee: CNH INDUSTRIAL AMERICA LLC, New Holland, PA (US)

( * ) Notice: Subject to any disclaimer, the term of this patent is extended or adjusted under 35 U.S.C. 154(b) by 141 days.

(21) Appl. No.: 16/789,783

(22) Filed: Feb. 13, 2020

(65) Prior Publication Data

US 2021/0252541 A1 Aug. 19, 2021

(51) Int. Cl.
*B05B 12/08* (2006.01)
*A01C 23/00* (2006.01)
*B05B 1/20* (2006.01)

(52) U.S. Cl.
CPC ............ *B05B 12/082* (2013.01); *A01C 23/00* (2013.01); *B05B 1/205* (2013.01)

(58) Field of Classification Search
CPC .... B05B 12/082; B05B 1/205; A01M 7/0089; A01M 11/00; A01C 23/00
USPC ......................................................... 239/11
See application file for complete search history.

(56) References Cited

U.S. PATENT DOCUMENTS

| | | | |
|---|---|---|---|
| 4,052,003 A | 10/1977 | Steffen | |
| 4,530,463 A | 7/1985 | Hiniker et al. | |
| 5,355,815 A | 10/1994 | Monson | |
| 5,956,255 A | 9/1999 | Flamme | |
| 6,010,079 A | 1/2000 | Mayfield et al. | |
| 6,678,580 B2 | 1/2004 | Benneweis | |
| 6,749,128 B1 | 6/2004 | Oosterman et al. | |
| 7,848,865 B2 | 12/2010 | Di et al. | |
| 8,180,560 B2 | 5/2012 | Harrison | |
| 8,191,798 B2 | 6/2012 | Hahn et al. | |
| 9,635,848 B2 | 5/2017 | Needham et al. | |
| 10,255,670 B1* | 4/2019 | Wu | H04N 7/183 |
| 10,441,965 B2* | 10/2019 | Feldhaus | B05B 1/20 |
| 10,512,212 B2* | 12/2019 | Koch | G01N 27/223 |

(Continued)

*Primary Examiner* — Chee-Chong Lee
*Assistant Examiner* — Kevin Edward Schwartz
(74) *Attorney, Agent, or Firm* — Rebecca Henkel; Rickard DeMille

(57) ABSTRACT

A system for controlling a ground speed of an agricultural sprayer includes a boom and a nozzle mounted on the boom. The nozzle, in turn, is configured to dispense a fan of an agricultural fluid as the agricultural sprayer travels across a field. Additionally, the system includes a sensor configured to capture data indicative of a spray quality parameter associated with the dispensed fan of the agricultural fluid. Furthermore, the system includes a controller communicatively coupled to the sensor. As such, the controller is configured to receive the captured data from the sensor as the agricultural sprayer travels across the field. Moreover, the controller is configured to determine the spray quality parameter based on the received data. In addition, the controller is configured to control a ground speed of the agricultural sprayer based on the determined spray quality parameter.

6 Claims, 4 Drawing Sheets

(56) References Cited

U.S. PATENT DOCUMENTS

| | | | |
|---|---|---|---|
| 2016/0050840 A1* | 2/2016 | Sauder | G05D 1/106 |
| | | | 701/3 |
| 2016/0368011 A1 | 12/2016 | Feldhaus et al. | |
| 2018/0281798 A1 | 10/2018 | Kremmer et al. | |
| 2019/0047010 A1 | 2/2019 | Barker et al. | |
| 2019/0150357 A1 | 5/2019 | Wu et al. | |
| 2020/0023398 A1* | 1/2020 | Feldhaus | B05B 13/005 |
| 2021/0127567 A1* | 5/2021 | Loukili | A01M 7/0057 |
| 2021/0182978 A1* | 6/2021 | Nissing | A01B 79/02 |

\* cited by examiner

SYSTEM AND METHOD FOR CONTROLLING THE GROUND SPEED OF AN AGRICULTURAL SPRAYER BASED ON A SPRAY QUALITY PARAMETER

FIELD OF THE INVENTION

The present disclosure generally relates to agricultural sprayers and, more particularly, to systems and methods for controlling the ground speed of an agricultural sprayer based on a spray quality parameter determined as the sprayer travels across a field.

BACKGROUND OF THE INVENTION

Agricultural sprayers apply an agricultural substance (e.g., a pesticide, a nutrient, and/or the like) onto crops as the sprayer is traveling across a field. To facilitate such travel, sprayers are configured as self-propelled vehicles or implements towed behind an agricultural tractor or other suitable work vehicle. A typical sprayer includes one or more booms on which a plurality of spaced apart nozzles is mounted. Each nozzle is configured to dispense or otherwise spray a fan of the agricultural substance onto underlying crops and/or weeds.

Pesticides, nutrients, and other agricultural substances are typically applied at a target application to achieve the desired agricultural outcome (e.g., a reduction in weed coverage or pest activity). As such, an agricultural sprayer includes a pump that supplies the agricultural substance to the nozzles at a pressure sufficient to meet the target application rate. However, when the ground speed of the sprayer is too high and/or certain conditions (e.g., high winds) occur, the pump(s) may be unable to generate a sufficient pressure to achieve the target application rate. When the target application rate of the agricultural substance is not met, the desired agricultural outcome may not be achieved.

Accordingly, an improved system and method for controlling the ground speed of an agricultural sprayer would be welcomed in the technology.

SUMMARY OF THE INVENTION

Aspects and advantages of the technology will be set forth in part in the following description, or may be obvious from the description, or may be learned through practice of the technology.

In one aspect, the present subject matter is directed to a system for controlling a ground speed of an agricultural sprayer. The system includes a boom and a nozzle mounted on the boom, with the nozzle configured to dispense a fan of an agricultural fluid as the agricultural sprayer travels across a field. Additionally, the system includes a sensor configured to capture data indicative of a spray quality parameter associated with the dispensed fan of the agricultural fluid. Furthermore, the system includes a controller communicatively coupled to the sensor. As such, the controller is configured to receive the captured data from the sensor as the agricultural sprayer travels across the field. Moreover, the controller is configured to determine the spray quality parameter based on the received data. In addition, the controller is configured to control a ground speed of the agricultural sprayer based on the determined spray quality parameter.

In another aspect, the present subject matter is directed to a method for controlling a ground speed of an agricultural sprayer. The agricultural sprayer, in turn, includes a boom and a nozzle mounted on the boom, with the nozzle configured to dispense a fan of an agricultural fluid as the agricultural sprayer travels across the field. The method includes receiving, with one or more computing devices, sensor data indicative of a spray quality parameter associated with the dispensed fan of the agricultural fluid. Furthermore, the method includes determining, with the one or more computing devices, the spray quality parameter based on the received sensor data. Moreover, the method includes controlling, with one or more computing devices, a ground speed of the agricultural sprayer based on the determined spray quality parameter.

These and other features, aspects and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which.

Figure 1:
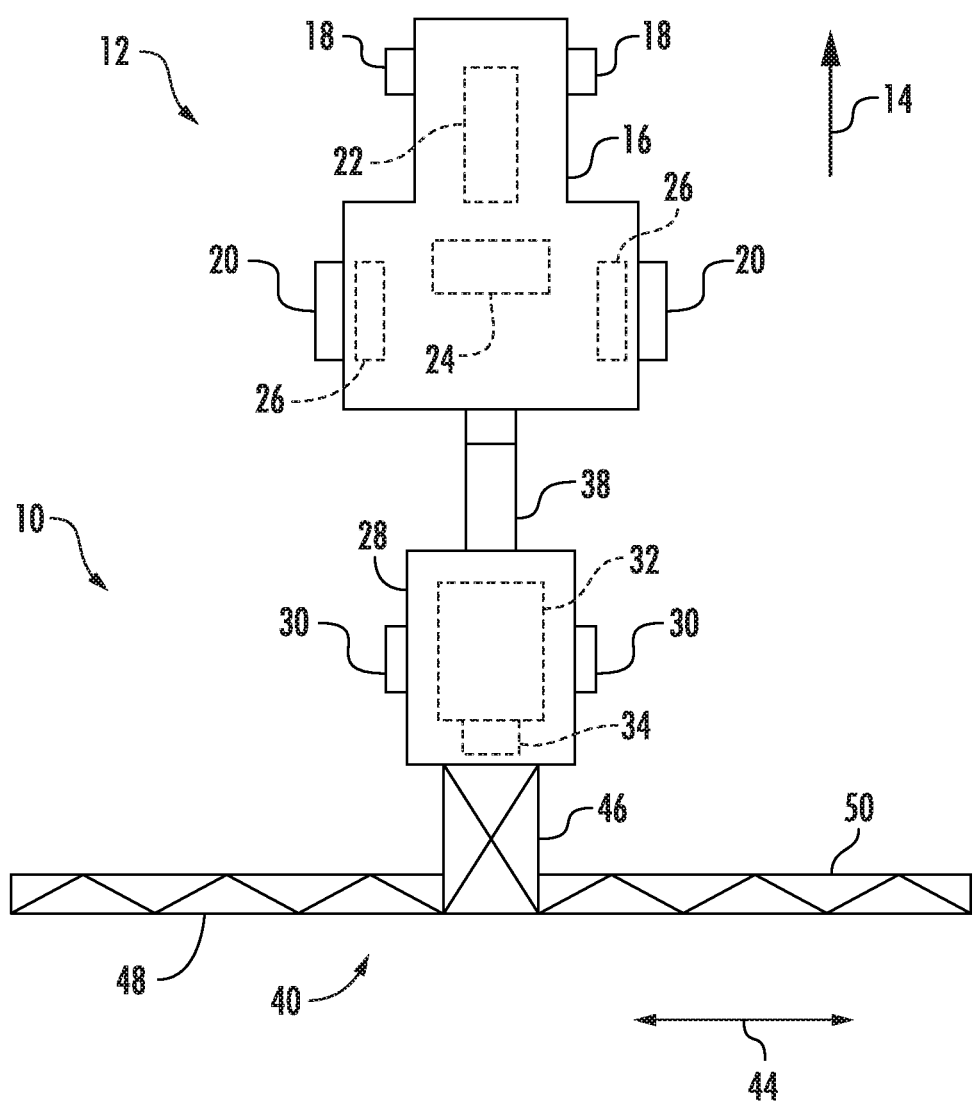
FIG. 1 illustrates a top view of one embodiment of an agricultural sprayer in accordance with aspects of the present subject matter.

Repeat use of reference characters in the present specification and drawings is intended to represent the same or analogous features or elements of the present technology.

DETAILED DESCRIPTION OF THE DRAWINGS

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to systems and methods for controlling the ground speed of an agricultural sprayer. Specifically, in several embodiments, a controller of the disclosed system may be configured to receive data indicative of a spray quality parameter as the sprayer travels across a field to dispense an agricultural substance (e.g., a pesticide or a nutrient) thereon. The spray quality parameter may, in turn, be associated with a fan of the agricultural fluid being dispensed by a nozzle of the sprayer. For example, in one embodiment, the spray quality parameter may be a spray fan parameter, such as the shape of the spray fan, the size or width of the spray fan, the size of the droplets/particles forming the spray fan, and/or an inconsistency between different spray fans. In another embodiment, the spray quality parameter may be the pressure of the agricultural fluid being dispensed by the nozzle. In a further embodiment, the spray quality parameter may be the airspeed of air flowing past a boom of the sprayer as the sprayer travels across the field. Thereafter, the controller may be configured to determine the spray quality parameter based on the received data.

In accordance with aspects of the present subject matter, the controller may be configured to control the ground speed of the agricultural sprayer based on the determined spray quality parameter. For example, in one embodiment, the controller may be configured to compare the determined spray quality parameter to a predetermined parameter range. Thereafter, when the determined spray quality parameter falls outside of the predetermined parameter range (thereby indicating the agricultural substance is not being applied at the target application rate and/or the spray quality has degraded), the controller may be configured to initiate a reduction in the ground speed of the agricultural sprayer until the spray quality parameter is returned to the predetermined parameter range.

Controlling the ground speed of the agricultural sprayer based on the determined spray quality parameter may ensure that the target application rate of the agricultural substance and/or the desired spray quality is maintained as sprayer travels across the field and field conditions change. In this respect, controlling the ground speed of the agricultural sprayer based on the determined spray quality parameter may improve agricultural outcomes.

Referring now to the drawings, FIG. 1 illustrates a top view of one embodiment of an agricultural sprayer 10 in accordance with aspects of the present subject matter. In general, the sprayer 10 may be configured to perform a spraying operation on a field as the sprayer 10 travels across the field in a direction of travel 14. As shown, in the illustrated embodiment, the agricultural sprayer 10 is configured as an implement to be towed across a field by a work vehicle 12 (e.g., an agricultural tractor). However, in alternative embodiments, the sprayer 10 may be configured as a self-propelled sprayer.

As shown in FIG. 1, the work vehicle 12 may include a frame or chassis 16 configured to support or couple to a plurality of components. For example, a pair of steerable front wheels 18 and a pair of driven rear wheels 20 may be coupled to the frame 16. The wheels 18, 20 may be configured to support the work vehicle 12 relative to the ground and move the work vehicle 12 in the direction of travel 14 across the field. However, in alternative embodiments, the front wheels 18 may be driven in addition to or in lieu of the rear wheels 20. Additionally, in further embodiments, the work vehicle 12 may include track assemblies (not shown) in place of the front and/or rear wheels 18, 20.

Furthermore, the work vehicle 12 may include one or more devices or components for adjusting the speed at which the work vehicle 12 moves across the field in the direction of travel 14. Specifically, in several embodiments, the work vehicle 12 may include an engine 22 and a transmission 24 mounted on the frame 16. In general, the engine 22 may be configured to generate power by combusting or otherwise burning a mixture of air and fuel. The transmission 24 may, in turn, be operably coupled to the engine 22 and may provide variably adjusted gear ratios for transferring the power generated by the engine power to the driven wheels 20. For example, increasing the power output by the engine 22 (e.g., by increasing the fuel flow to the engine 22) and/or shifting the transmission 24 into a higher gear may increase the speed at which the work vehicle 12 moves across the field. Conversely, decreasing the power output by the engine 22 (e.g., by decreasing the fuel flow to the engine 22) and/or shifting the transmission 24 into a lower gear may decrease the speed at which the work vehicle 12 moves across the field.

Additionally, the work vehicle 12 may include one or more braking actuators 26 that, when activated, reduce the speed at which the work vehicle 12 moves across the field, such as by converting energy associated with the movement of the work vehicle 12 into heat. For example, in one embodiment, the braking actuator(s) 26 may correspond to a suitable hydraulic cylinder(s) configured to push a stationary frictional element(s) (not shown), such as a brake shoe(s) or a brake caliper(s), against a rotating element(s) (not shown), such as a brake drum(s) or a brake disc(s). However, in alternative embodiments, the braking actuator(s) 26 may any other suitable hydraulic, pneumatic, mechanical, and/or electrical component(s) configured to convert the rotation of the rotating element(s) into heat. Furthermore, although FIG. 1 illustrates one braking actuator 26 provided in operative association with each of the driven wheels 20, the work vehicle 12 may include any other suitable number of braking actuators 26. For example, in one embodiment, the work vehicle 12 may include one braking actuator 26 provided in operative association with each of the steerable wheels 18 in addition to or in lieu of the driven wheels 20.

Moreover, as shown in FIG. 1, the sprayer 10 may include a frame 28 configured to support or couple to a plurality of components. For example, a pair of wheels 30 may be coupled to the frame 28 and configured to support the sprayer 10 relative to the ground. As such, the wheels 30 may allow the vehicle 12 to tow the sprayer 10 across the field in the direction of travel 14. Furthermore, the frame 28 may support a tank 32 configured to store or hold an agricultural substance. In several embodiments, the tank 32 may be configured to store a liquid agricultural substance, such as a pesticide a fertilizer, or a nutrient. A pump 34 may be configured to supply the agricultural substance stored within the tank 32 to a plurality of nozzles 36 (FIG. 2) on the sprayer 10 As will be described below, the nozzles 36 may be configured to spray or otherwise dispense the agricultural substance onto the field as the sprayer 10 is towed across the field by the vehicle 12. Additionally, a hitch assembly 38 may be connected to the frame 26 and configured to couple the sprayer 10 to the vehicle 12.

Figure 2:
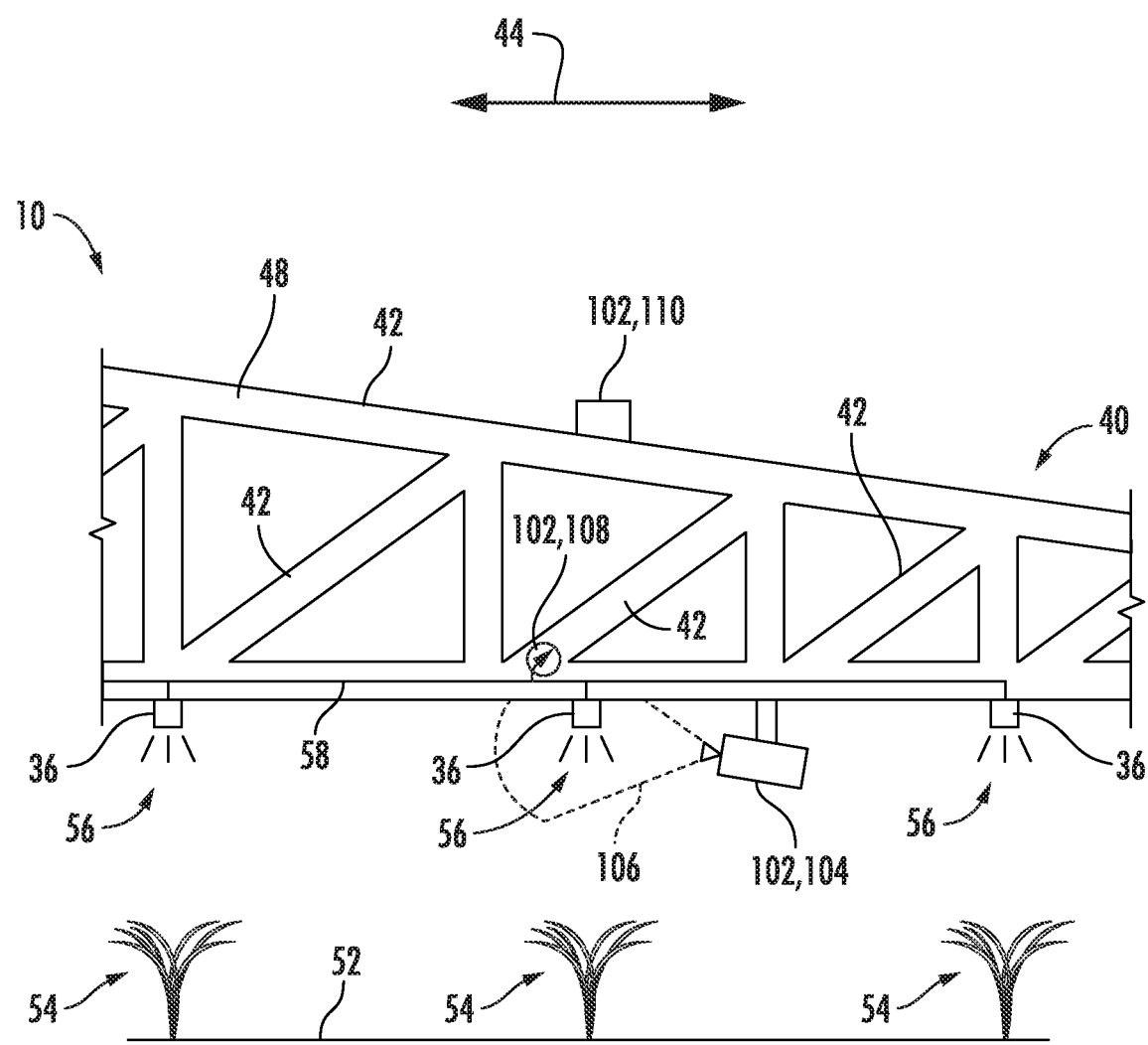
FIG. 2 illustrates a partial front view of one embodiment of a boom of an agricultural sprayer in accordance with aspects of the present subject matter, particularly illustrating a plurality of nozzles supported on the boom.

Furthermore, as shown in FIGS. 1 and 2, the sprayer 10 may include a boom assembly 40 coupled to and/or supported on the frame 28. In general, the boom assembly 40 may include a plurality of structural frame members 42, such as beams, bars, and/or the like. Specifically, in several embodiments, the boom assembly 40 may extend outward from the frame 28 in a lateral direction (indicated by arrow 44 in FIGS. 1 and 2), with the lateral direction 44 extending perpendicular to the direction of travel 14. For example, in one embodiment, the boom assembly 40 may include a center boom section 46 coupled to the frame 28 and a pair of wing boom sections 48, 50 extending outwardly from the center boom section 46 in the lateral direction 44. However, in alternative embodiments, the boom assembly 40 may include any other suitable configuration. For example, in one embodiment, the boom assembly 40 may include a different number of boom sections, such as a single boom section, a pair of boom sections, or four or more boom sections.

As shown in FIG. 2, as mentioned above, the boom assembly 40 may be configured to support a plurality of nozzles 36. Each nozzle 36 may, in turn, be configured to dispense the agricultural substance stored within the tank 32 (FIG. 1) onto the underlying field 52 and/or plants 54. Specifically, in several embodiments, the nozzles 36 may be mounted on and/or coupled to the frame members 42 of the boom assembly 40, with the nozzles 36 being spaced apart from each other along the lateral direction 44. Furthermore, fluid conduits 58 may fluidly couple the nozzles 36 to the tank 32 and the pump 34 (FIG. 1). In this respect, as the sprayer 10 travels across the field in the direction of travel 14 to perform a spraying operation thereon, the pump 34 (FIG. 1) may pump the agricultural substance from the tank 32 through the fluid conduit(s) 58 to each of the nozzles 36. The nozzles 36 may, in turn, dispense or otherwise spray a fan 52 of the agricultural substance onto the underlying field 54 and/or plants. For example, in one embodiment, the nozzles 36 may correspond to flat fan nozzles configured to dispense a flat fan of the agricultural substance. However, in alternative embodiments, the nozzles 36 may correspond to any other suitable types of nozzles, such as dual pattern nozzles and/or hollow cone nozzles.

It should be further appreciated that the configuration of the sprayer 10 and the vehicle 12 described above and shown in FIGS. 1 and 2 is provided only to place the present subject matter in an exemplary field of use. Thus, it should be appreciated that the present subject matter may be readily adaptable to any manner of sprayer and/or vehicle configuration.

In accordance with aspects of the present subject matter, one or more spray quality sensors 102 may be installed on the sprayer 10 and/or the vehicle 12. In general, the spray quality sensor(s) 102 may be configured to capture data indicative of one or more spray quality parameters associated with the fans 56 of the agricultural fluid being dispensed by the nozzles 36. The spray quality parameter(s) may, in turn, be indicative of the quality of the spraying operation, such as whether a target application rate of the agricultural substance is being met. As will be described below, a controller may be configured to control the ground speed of the sprayer 10 based on the captured data.

In several embodiments, the spray quality sensor(s) 102 may correspond to one or more imaging devices 104. In such embodiments, each imaging device 104 may be coupled to or mounted on the boom assembly 40 such that the one or more fans 56 of the agricultural substance are positioned within an associated field of view (indicated by dashed lines 106 in FIG. 2). As such, each imaging device 104 may be configured to capture image data depicting one or more spray fans. As will be described below, a controller may be configured to analyze the image data to determine one or more spray fan parameters of the depicted spray fans 56. For example, such spray fan parameters may include the shape of the spray fans 56, the size or width of the spray fans 56, the height of the spray fans 56, the size of the droplets/particles forming the spray fans 56, and/or an inconsistency in such parameters between two or more spray fans 56. In the illustrated embodiment, a single imaging device 104 is installed on the boom assembly 40, with a single spray fan 56 positioned within its field of view 106. However, in alternative embodiments, any other suitable number of imaging devices 104 may be installed on the boom assembly 40. Furthermore, any other suitable number of spray fans 56 may be positioned the field of view 106 of each imaging device 104.

The imaging device(s) 104 may correspond to any suitable sensing device(s) configured to detect or capture images or other image-like data associated with the spray fans present within its field of view 106. For example, in several embodiments, the imaging device(s) 104 may correspond to a suitable camera(s) configured to capture three-dimensional images of the spray fans present within its field of view 106. For instance, in a particular embodiment, the imaging device(s) 104 may correspond to a stereographic camera(s) having two or more lenses with a separate image sensor for each lens to allow the camera(s) to capture stereographic or three-dimensional images. However, in alternative embodiments, the imaging device(s) 104 may correspond to any other suitable sensing device(s) configured to capture image or image-like data, such as a monocular camera(s), a LIDAR sensor(s), and/or a RADAR sensor(s).

In another embodiment, the spray quality sensor(s) 102 may correspond to one or more pressure sensors 108. In general, the pressure sensor(s) 108 may be configured to capture data indicative of the pressure of the agricultural substance being supplied to the nozzles 36. As such, the pressure sensor(s) 108 may be provided in fluid communication with one of the fluid conduits 58. For example, the pressure sensor 108 may correspond to a diaphragm pressure sensor, a piston pressure sensor, a strain gauge-based pressure sensor, an electromagnetic pressure sensor, and/or the like.

In a further embodiment, the spray quality sensor(s) 102 may correspond to one or more airspeed sensors 110. In general, the airspeed sensor(s) 110 may be configured to capture data indicative of the airspeed of the air flowing past the boom assembly 40 as the sprayer 10 travels in the direction of travel 14. The airspeed data may, in turn, be indicative of the speed at which the air moves relative the boom assembly 40. In this respect, airspeed data may take in account both the airflow caused by the movement of the sprayer 10 relative to the ground and the airflow caused by any wind that is present. For example, the airspeed sensor(s) 110 may correspond to a pitot tube, an anemometer, and/or the like. As shown, the airspeed sensor(s) 110 are mounted on the top of the boom assembly 40. However, in alternative embodiments, the airspeed sensor(s) 110 may be installed on the sprayer 10 at any other suitable location(s). Moreover, in further embodiments, the spray quality sensor(s) 102 may correspond to any other suitable sensor(s) capable of capturing data indicative of the quality of the spray fans 56 emitted by the nozzles 36.

Figure 3:
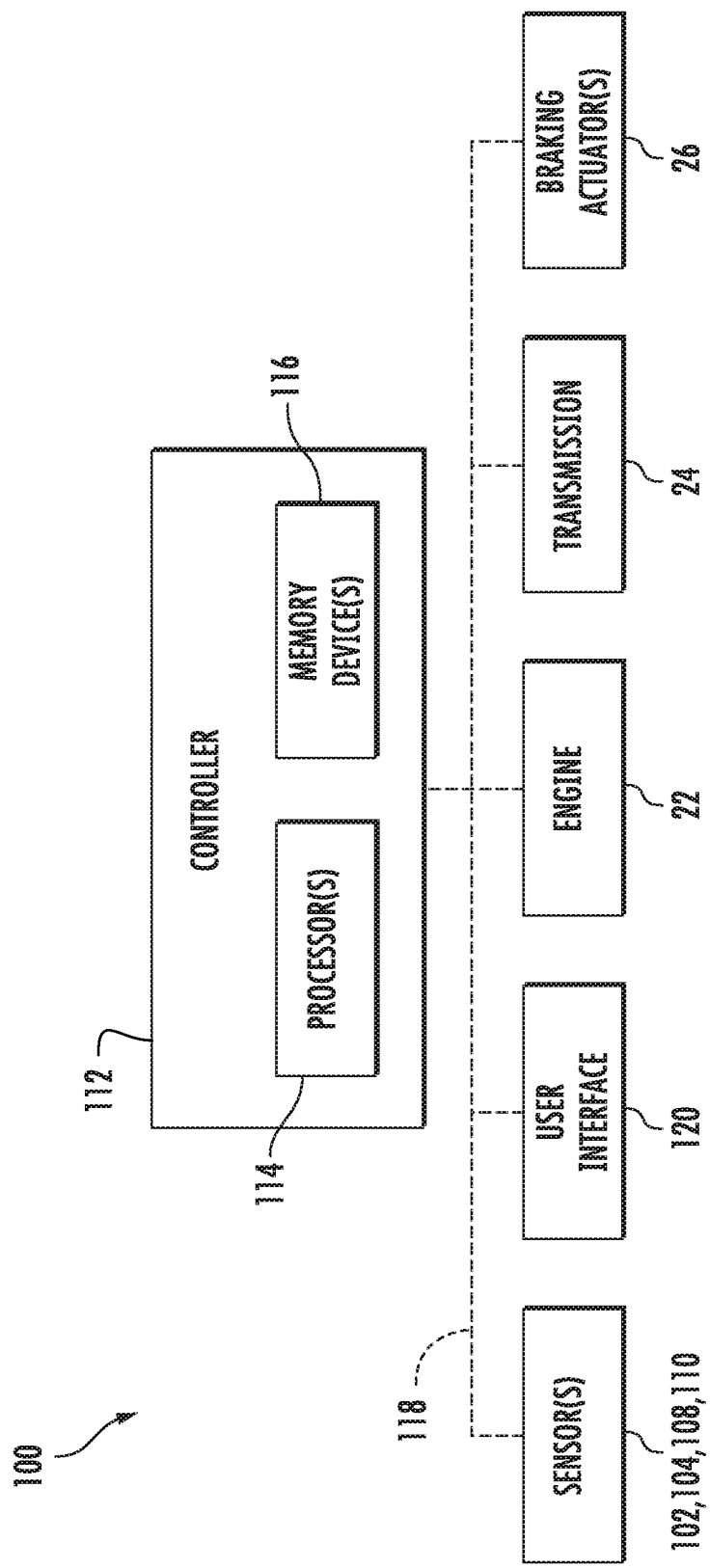
FIG. 3 illustrates a schematic view of one embodiment of a system for controlling a ground speed of an agricultural sprayer in accordance with aspects of the present subject matter.

Referring now to FIG. 3, a schematic view of one embodiment of a system 100 for controlling the ground speed of an agricultural sprayer is illustrated in accordance with aspects of the present subject matter. In general, the system 100 will be described herein with reference to the agricultural sprayer 10 and the work vehicle 12 described above with reference to FIGS. 1 and 2 However, it should be appreciated by those of ordinary skill in the art that the disclosed system 100 may generally be utilized with agricultural sprayers having any other suitable sprayer configuration and/or work vehicles having any other suitable vehicle configuration.

As shown in FIG. 3, the system 100 may include a controller 112 positioned on and/or within or otherwise associated with the sprayer 10 or the vehicle 12. In general, the controller 112 may comprise any suitable processor-based device known in the art, such as a computing device or any suitable combination of computing devices. Thus, in several embodiments, the controller 112 may include one or more processor(s) 114 and associated memory device(s) 116 configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 116 of the controller 112 may generally comprise memory element(s) including, but not limited to, a computer readable medium (e.g., random access memory (RAM)), a computer readable non-volatile medium (e.g., a flash memory), a floppy disc, a compact disc-read only memory (CD-ROM), a magneto-optical disc (MOD), a digital versatile disc (DVD), and/or other suitable memory elements. Such memory device(s) 116 may generally be configured to store suitable computer-readable instructions that, when implemented by the processor(s) 114, configure the controller 112 to perform various computer-implemented functions.

In addition, the controller 112 may also include various other suitable components, such as a communications circuit or module, a network interface, one or more input/output channels, a data/control bus and/or the like, to allow controller 112 to be communicatively coupled to any of the various other system components described herein (e.g., the engine 22, the transmission 24, the braking actuator(s) 26, and/or the sensor(s) 102, 104, 108, 110). For instance, as shown in FIG. 3, a communicative link or interface 118 (e.g., a data bus) may be provided between the controller 112 and the components 22, 24, 26, 102, 104, 108, 110 to allow the controller 112 to communicate with such components 22, 24, 26, 102, 104, 108, 110 via any suitable communications protocol (e.g., CANBUS).

The controller 112 may correspond to an existing controller(s) of the sprayer 10 and/or the vehicle 12, itself, or the controller 112 may correspond to a separate processing device. For instance, in one embodiment, the controller 112 may form all or part of a separate plug-in module that may be installed in association with the sprayer 10 and/or the vehicle 12 to allow for the disclosed systems to be implemented without requiring additional software to be uploaded onto existing control devices of the sprayer 10 and/or the vehicle 12.

In addition, the functions of the controller 112 may be performed by a single processor-based device or may be distributed across any number of processor-based devices, in which instance such devices may be considered to form part of the controller 112. For instance, the functions of the controller 112 may be distributed across multiple application-specific controllers, such as an engine controller, a transmission controller, an implement controller, and/or the like.

Furthermore, in one embodiment, the system 100 may also include a user interface 120. More specifically, the user interface 120 may be configured to configured to receive user inputs from the operator (e.g., inputs associated with a predetermined range for the spray quality parameter(s)) to the operator of the sprayer/vehicle 10/12. As such, the user interface 120 may include the may include one or more input devices (not shown), such as touchscreens, keypads, touchpads, knobs, buttons, sliders, switches, mice, microphones, and/or the like, which are configured to receive user inputs from the operator. The user interface 120 may, in turn, be communicatively coupled to the controller 112 via the communicative link 118 to permit the inputs to be transmitted from the user interface 120 to the controller 112. In addition, some embodiments of the user interface 120 may include one or more feedback devices (not shown), such as display screens, speakers, warning lights, and/or the like, which are configured to provide feedback from the controller 112 to the operator. In one embodiment, the user interface 120 may be mounted or otherwise positioned within a cab of the vehicle 12. However, in alternative embodiments, the user interface 120 may mounted at any other suitable location.

In several embodiments, the controller 112 may be configured to control the operation of the sprayer 10 and/or the work vehicle 12 such that the sprayer 10 performs a spraying operation on a field. More specifically, the controller 112 may be configured to control the operation of one or more components of the sprayer 10 and/or the work vehicle 12 (e.g., the engine 22 and/or the transmission 24) such that the sprayer 10 travels across the field in the direction of travel 14. As the sprayer 10 travels across the field, each nozzle 36 may dispense a fan of the agricultural substance stored within the tank 32 onto the underlying field and/or plants at a target application rate. In general, the target application rate for an agricultural substance is an amount (e.g., a volume or weight) of the substance to be applied per unit area of the field (e.g., per acre) to provide the desired agricultural outcome (e.g., weed coverage reduction, pest reduction, and/or the like).

Additionally, the controller 112 may be configured to determine one or more spray quality parameters as the sprayer performs the spraying operation. As described above, the sprayer 10 may include one or more spray quality sensors 102, with each spray quality sensor 102 configured to capture data indicative of one or more spray quality parameters associated with one or more fans of the agricultural fluid being dispensed by the sprayer 10. In this regard, as the sprayer 10 travels across the field to perform the spraying operation thereon, the controller 112 may be configured to receive the captured data from the spray quality sensor(s) 102 (e.g., via the communicative link 118). Thereafter, the controller 112 may be configured to process/analyze the received data to determine or estimate the spray quality parameter value(s) for the sprayer 10. For instance, the controller 112 may include a look-up table(s), suitable mathematical formula, and/or algorithms stored within its memory device(s) 116 that correlates the received sensor data to the spray quality parameter value(s). As will be described below, the controller 112 may be configured to control the ground speed of the sprayer 10 based on the received sensor data to maintain the target application rate of the agricultural substance and the desired spray quality (e.g., droplets size) as conditions within the field vary.

The determined spray quality parameter(s) may correspond to any suitable parameter(s)/characteristic(s) indicative of the quality of the spray fans being dispensed by the nozzles. For example, in several embodiments, the determined spray quality parameter(s) may correspond to one or more spray fan parameters. As described above, in several embodiments, the spray quality sensor(s) 102 may include one or more imaging devices 104 configured to capture image data depicting the spray fans of one or more of the nozzles 36 of the sprayer 10. In such embodiments, the controller 112 may be configured to analyze the received image data to determine the shape(s) and/or size(s) (e.g., the width(s)) the imaged spray fan(s). Additionally, the controller 112 may be configured to analyze the received image data to determine the size of the droplets or particles forms the imaged spray fan(s). Furthermore, when multiple spray fans are imaged, the controller 112 may be configured to analyze the received image data to identify any inconsistencies in the identified shapes and/or sizes of the spray fans. Moreover, in one embodiment, the determined spray quality parameter(s) may correspond to the pressure of the agricultural fluid being dispensed by the nozzles 36. As described above, in several embodiments, the spray quality sensor(s) 102 may include a pressure sensor 108 configured to capture data indicative of the pressure of the agricultural substance within the fluid conduit(s) 58. In such embodiments, the controller 112 may be configured to analyze the received sensor data to determine pressure of the agricultural substance being supplied to the nozzles 36. In addition, in a further embodiment, the determined spray quality parameter(s) may correspond to the airspeed of the air flowing past the boom assembly 40 of the sprayer 10. As described above, in several embodiments, the spray quality sensor(s) 102 may include an airspeed sensor 110 configured to capture data indicative of the airspeed of the air flowing past the boom assembly 40. In such embodiments, the controller 112 may be configured to analyze the received sensor data to determine airspeed of the air flowing past the boom assembly 40.

In accordance with aspects of the present subject matter, the controller 112 may be configured to control the ground speed of the sprayer 10 based on the determined spray quality parameter(s). As described above, when performing a spraying operation, the sprayer 10 may generally dispense the agricultural substance such that a target application rate and/or desired spray quality is achieved. The desired spray quality may refer to a desired range of spray fan parameter values that achieve the desired agricultural outcome (e.g., a reduction in weed coverage or pest activity). For example, in one embodiment, the desired spray quality may correspond to a desired size range of the droplets/particles forming the spray fans. However, in certain instances, such as when the sprayer 10 is traveling too fast, the wind speed is too high, and/or a nozzle(s) is occluded or partially occluded, the sprayer 10 may be unable to dispense the agricultural substance at the target application rate and/or with the desired spray quality. In such instances, the determined spray quality parameter(s) may fall outside of an associated predetermined parameter range. As such, in several embodiments, the controller 112 may be configured to compare the determined spray quality parameter(s) to the associated predetermined parameter range. In one embodiment, the controller 112 may be configured to receive an input from the operator (e.g., via the user interface 120) associated with the predetermined parameter range. When the determined spray quality parameter(s) falls outside of the associated range, the controller 112 may be configured to initiate a reduction in the ground speed of the sprayer 10 until the spray quality parameter(s) is returned to the associated range. Reducing the ground speed of the sprayer 10 until the spray quality parameter(s) is returned to the associated range may result in the sprayer dispensing the agricultural substance at the target application rate and/or with the desired spray quality (e.g., the desired droplet size).

In several embodiments, the controller 112 may be configured to increase the ground speed of the sprayer 10 based on the determined spray quality parameter(s). In certain instances, the sprayer 10 may be able to travel at a higher ground speed and still maintain the target application rate and/or desired spray quality, such as when the sprayer operator has selected an overly cautious ground speed. As such, the controller 112 may be configured to monitor the time period across which the determined spray quality parameter(s) is within the associated predetermined parameter range. Thereafter, when the monitored time period exceeds a predetermined time period (thereby indicating that the sprayer 10 may be able to travel at a higher ground speed and still maintain the target application rate and/or the desired spray quality), the controller 112 may be configured to initiate an increase in the ground speed of the agricultural sprayer. When the value(s) of the monitored spray quality parameter(s) approaches a minimum or maximum value of the associated range, the controller 112 may maintain the ground speed of the sprayer 10. Increasing the ground speed of the sprayer 10 in this manner may allow the sprayer 10 to travel the maximum speed at which the target application rate may be met, thereby increasing the efficiency of the spraying operation.

The controller 112 may be configured to initiate an adjustment to the ground speed of the sprayer 10 in any suitable manner. For example, the controller 112 may be configured to control the operation of the engine 22, the transmission 24, and/or the braking actuator(s) 26 to execute the desired adjustment to the ground speed of the sprayer 10. Specifically, the controller 112 may be configured to transmit control signals to such components 22, 24, 26 (e.g., via the communicative link 118). The control signals may, in turn, instruct such components to adjust their operation to increase or decrease the ground speed of the sprayer 10 as desired. In embodiments in which the sprayer 10 is towed behind the work vehicle, the controller 112 may be configured to transmit the control signals via ISOBUS Class 3 (ISO 11783-9) communications protocols. However, in alternative embodiments, the controller 112 may be configured to transmit the control signals via any other suitable communications protocols (e.g., CANBUS).

Figure 4:
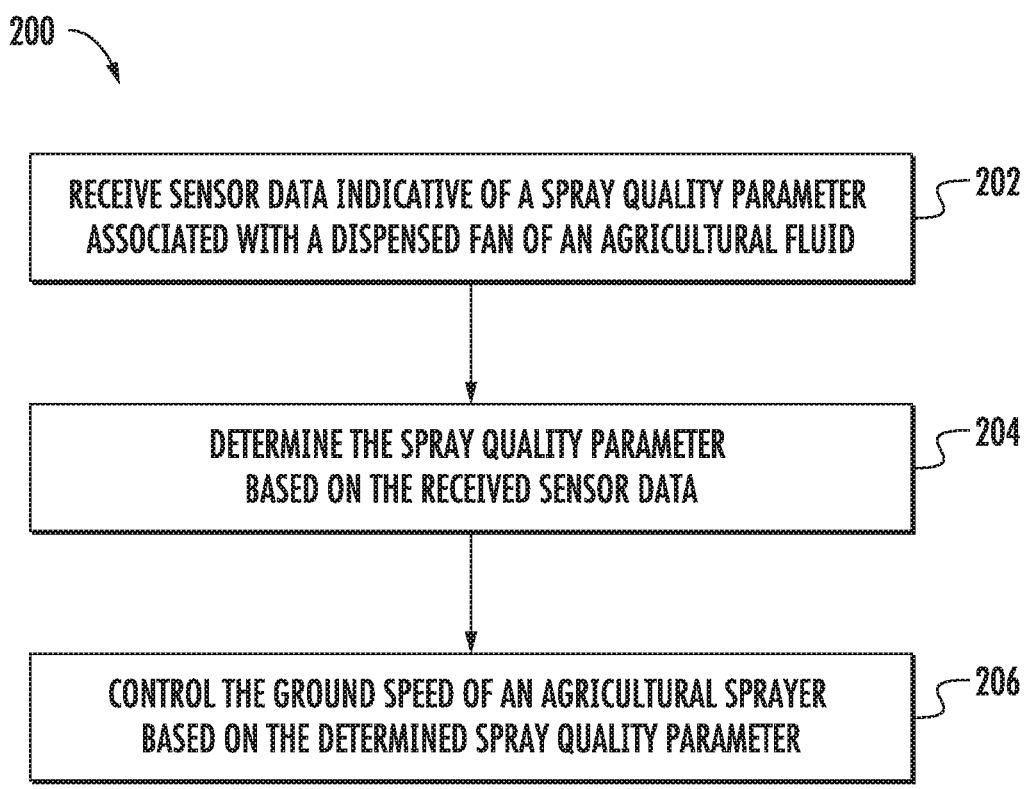
FIG. 4 illustrates a flow diagram of one embodiment of a method for controlling a ground speed of an agricultural sprayer in accordance with aspects of the present subject matter.

Referring now to FIG. 4, a flow diagram of one embodiment of a method 200 for controlling the ground speed of an agricultural sprayer is illustrated in accordance with aspects of the present subject matter. In general, the method 200 will be described herein with reference to the agricultural sprayer 10, the work vehicle 12, and the system 100 described above with reference to FIGS. 1-3. However, it should be appreciated by those of ordinary skill in the art that the disclosed method 200 may generally be implemented with any agricultural sprayer having any suitable sprayer configuration, with any work vehicle having any suitable vehicle configuration and/or within any system having any suitable system configuration. In addition, although FIG. 4 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 4, at (202), the method 200 may include receiving, with one or more computing devices, sensor data indicative of a spray quality parameter associated with a dispensed fan of an agricultural fluid. For instance, as described above, the controller 112 may be configured to receive data from one or more spray quality sensors 102. Such data may, in turn, be indicative of one or more spray quality parameter associated with one or more fans of an agricultural fluid being dispensed by an agricultural sprayer 10.

Additionally, at (204), the method 200 may include determining, with the one or more computing devices, the spray quality parameter based on the received sensor data. For instance, as described above, the controller 112 may be configured to determine the spray quality parameter(s) based on the received sensor data.

Moreover, as shown in FIG. 4, at (206), the method 200 may include controlling, with one or more computing devices, the ground speed of the agricultural sprayer based on the determined spray quality parameter. For instance, as described above, the controller 112 may be configured to adjust the operation of the engine 22, the transmission 24, and/or the braking actuator(s) 26 of the sprayer 10 or the work vehicle 12 to control the ground speed of the sprayer 10 based on the determined spray quality parameter(s).

It is to be understood that the steps of the method 200 are performed by the controller 112 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the controller 112 described herein, such as the method 200, is implemented in software code or instructions which are tangibly stored on a tangible computer readable medium. The controller 112 loads the software code or instructions via a direct interface with the computer readable medium or via a wired and/or wireless network. Upon loading and executing such software code or instructions by the controller 112, the controller 112 may perform any of the functionality of the controller 112 described herein, including any steps of the method 200 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

The invention claimed is:

1. A system for controlling a ground speed of an agricultural sprayer, the system comprising:
   a boom;
   a nozzle mounted on the boom, the nozzle configured to dispense a fan of an agricultural fluid as the agricultural sprayer travels across a field;
   a sensor mounted on the boom, the sensor configured to capture data indicative of an air speed of air flowing past the boom as the agricultural sprayer travels across the field; and
   a controller communicatively coupled to the sensor, wherein the controller:
      receives the captured data from the sensor as the agricultural sprayer travels across the field;
      determines the air speed of the air flowing past the boom as the agricultural sprayer travels across the field based on the received data;
      compares the determined air speed of the air flowing past the boom as the agricultural sprayer travels across the field a predetermined air speed range;
      monitors a time period across which the determined air speed of the air flowing past the boom as the agricultural sprayer travels across the field is within the predetermined air speed range; and
      initiates an increase in the ground speed of the agricultural sprayer when the determined air speed of the air flowing past the boom as the agricultural sprayer travels across the field is within the predetermined air speed range across a predetermined time period.

2. The system of claim 1, wherein the controller initiates a reduction in the ground speed of the agricultural sprayer when the determined air speed of the air flowing past the boom as the agricultural sprayer travels across the field falls below a minimum value of the predetermined air speed range.

3. The system of claim 1, wherein the controller receives an input associated with the predetermined air speed range from an operator of the agricultural sprayer.

4. A method for controlling a ground speed of an agricultural sprayer, the agricultural sprayer including a boom and a nozzle mounted on the boom, the nozzle configured to dispense a fan of an agricultural fluid as the agricultural sprayer travels across a field, the method comprising:
   receiving, with a controller, sensor data indicative of an air speed of air flowing past the boom as the agricultural sprayer travels across the field from a sensor mounted on the boom;
   determining, with the controller, the air speed of the air flowing past the boom as the agricultural sprayer travels across the field based on the received sensor data;
   comparing, with the controller, the determined air speed of the air flowing past the boom as the agricultural sprayer travels across the field to a predetermined air speed range;
   monitoring, with the controller, a time period across which the determined air speed of the air flowing past the boom as the agricultural sprayer travels across the field is within the predetermined air speed range; and
   initiating, with the controller, an increase in the ground speed of the agricultural sprayer when the determined air speed of the air flowing past the boom as the agricultural sprayer travels across the field is within the predetermined air speed range across a predetermined time period.

5. The method of claim 4, further comprising:
   initiating, with the controller, a reduction in the ground speed of the agricultural sprayer when the determined air speed of the air flowing past the boom as the agricultural sprayer travels across the field falls below a minimum value of the predetermined air speed range.

6. The method of claim 4, further comprising:
   receiving, with the controller, an input associated with the predetermined air speed range from an operator of the agricultural sprayer.

* * * * *